Sept. 20, 1966 A. H. SWAN 3,273,600
FLEXIBLE TUBE

Filed June 10, 1963 2 Sheets-Sheet 1

INVENTOR.
ALFRED H. SWAN
BY Lyon & Lyon
ATTORNEYS

United States Patent Office 3,273,600
Patented Sept. 20, 1966

3,273,600
FLEXIBLE TUBE
Alfred H. Swan, Newport Beach, Calif., assignor to Air Reduction Company, Inc., Murray Hill, N.J., a corporation of New Jersey
Filed June 10, 1963, Ser. No. 286,826
4 Claims. (Cl. 138—122)

This invention relates to flexible tubes, and is a continuation-in-part of my copending application Serial No. 173,404, filed February 15, 1962, now abandoned. Included in the objects of this invention are:

First, to provide a flexible tube formed of an inner and outer extruded plastic strip, each of channel or U-shaped cross section; the inner strip having a relatively wide web portion and flexible flanges, and wound so that flanges are directed radially outward and the adjacent convolutions are contiguous so that the flanges form contiguous pairs; the outer strip having a relatively narrow web which overlies the pairs of flanges of the inner strip and wrapped about the inner strap, and having radially inwardly directed flanges overlying and bonded to the flanges of the first strip so that the confronting flanges of the inner strip may be flexed away from each other to permit bending of the tube.

Second, to provide a flexible tube formed of extruded plastic inner and outer strips of channel shaped cross-section wherein the contiguous flanges of the inner strips define a bead and the slot formed in the outer strip has an essentially key-hole shape to accommodate the bead so as to provide a mechanical interlock in addition to the bonded connection between the strips.

Third, to provide a flexible tube which, by reason of the continuous contact of the convolutions of the first or inner U-shaped strip, not only resists longitudinally shortening of the tube when subjected to internal vacuum pressures but also presents a smooth internal surface so as to provide a flexible tube having efficient flow characteristics.

Fourth, to provide a flexible tube which is formed of plastic material having a minimum wall thickness to minimize its weight, and is provided with external ribs which may have substantial radial dimensions to provide a tube having high crushing strength.

Fifth, to provide a flexible tube formed of interlocking inner and outer U-shaped strips, which is encased in a helically wrapped tape so arranged that the tape is depressed within and bridges between the ribs of the tube to permit flexibility and to provide increased wearing properties.

Sixth, to provide a flexible tube of this type in which the encasing laminated tape forms with the U-shaped strips a helical chamber which is filled with a foamed elastomer to exclude liquids from the helical chamber and in addition to increase the insulating properties of the tubing, and still further to facilitate the construction of a flexible tubing having an effective density less than water.

Seventh, to provide a flexible tube which may be so arranged as to carry in its walls one or two, or more, conductors for the purpose of conducting electricity between the ends of the tube.

Eighth, to provide a flexible tube composed principally of interlocking plastic strips in which may be embedded a metal coil to increase the hoop strength of the tube.

With the above and other objects in view, as may appear hereinafter, reference is directed to the accompanying drawings in which.

Figure 1:
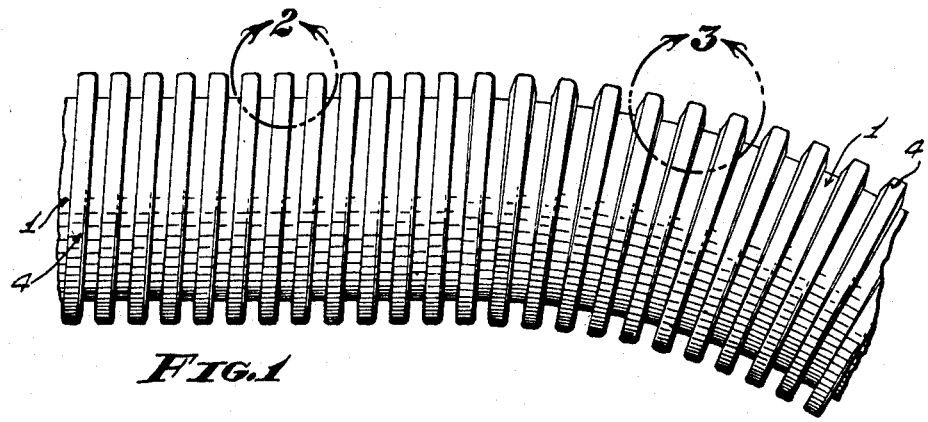
FIGURE 1 is a fragmentary side view showing one form of the flexible tube.
Figure 2:
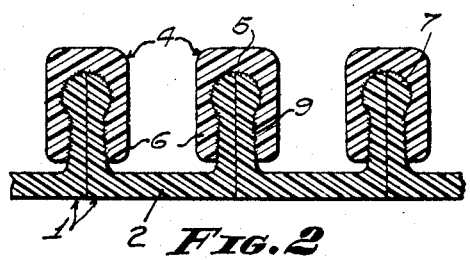
FIGURE 2 is an enlarged, fragmentary, sectional view thereof taken within circle 2 of FIGURE 1.

Reference is first directed to FIGURES 1-5. The flexible tube here illustrated includes an inner or first plastic strip 1 having a relatively wide web 2 bordered by flanges 3. The inner plastic strip 1 is wrapped helically about a mandrel, not shown, to place the convolutions in contiguous relation, as shown in FIGURE 2. The flanges of adjacent convolutions are thus placed in mutual contact. The inner surface of the web 2 and the outer surfaces of the flanges 3 preferably define right angles, so that, when the inner plastic strip 1 is wrapped, a tube is formed which, in its straight condition, presents a smooth, uninterrupted, cylindrical bore.

An outer or second plastic strip 4 is wrapped about the inner plastic strip 1. The outer plastic strip includes a relatively narrow web 5 bordered by flanges 6. The web 5 is of appropriate width to bridge a pair of contiguous flanges 3, and the flanges 6 overlie the distal sides of the contiguous flanges.

The extremities of the flanges 3 of the inner strip are provided at their confronting sides with semicircular or half beads 7, so that when the strip is wound, the flanges of contiguous convolutions form a continuous circular or full bead. The root portion of the groove formed in the outer strip 4 is laterally enlarged, as indicated by 8, to accommodate the bead 7 and provide a mechanical interlock between the strips 1 and 4.

After the outer plastic strip 4 is wrapped about the inner plastic strip 1, an adhesive or other bonding means is applied in such a manner that the confronting surfaces between the flanges 3 and 6 are bonded as indicated by 9. It should be noted, however, that the confronting surfaces between the flanges 3 are not bonded to each other.

Figure 3:
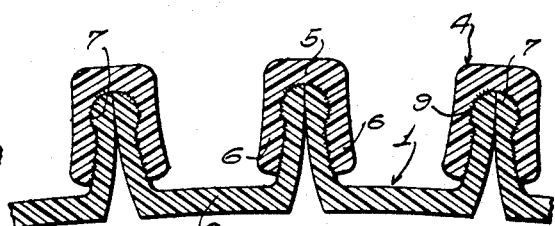
FIGURE 3 is an enlarged, fragmentary, sectional view thereof taken within circle 3 of FIGURE 1.
Figure 4:
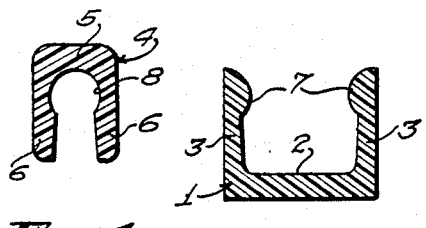
FIGURE 4 is an enlarged, sectional view of the outer or second plastic strip.
Figure 5:
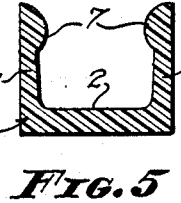
FIGURE 5 is a similar sectional view of the first or inner plastic strip.

In order for the resulting tube to flex the radially outer side stretches, as indicated in FIGURE 3. This is accomplished by the spreading of the normally contiguous flanges 3.

Reference is now directed to FIGURES 6 through 9 wherein the inner and outer strips are modified by omission of the beads 7 and corresponding groove enlargement 8.

For some purposes it is desirable to cover the helical rib formed by the outer or second plastic strip 4. This may be done by helically wrapping a thin plastic tape 10 about the outer or second plastic strip 4. The convolutions of the plastic tape 10 preferably overlap each other so that in effect a multiple lamination is formed.

The plastic tape 10 is wrapped in such a manner that it is depressed between the outer plastic strip 4 to form external grooves or corrugations 11, and also forms with the web of the inner plastic strip a helical channel 12.

For many purposes the helical channel 12 may be left free. However, for some uses of the flexible tube, for example, uses which involve submergence of the flexible tube, it is desirable to prevent entrance of the water into the helical channel 10. This is accomplished by filling the channel 10 with a foamed elastomer 13.

The foamed elastomer 13 may be in the form of a premolded strip which is wrapped in place after the flexible tube is formed. Or if desired, the elastomer 13 may be introduced during the forming operation in a semiliquid and unexpanded state, and permitted to foam in place within the completed tube. The foamed elastomer 13 may also be utilized for the purpose of improving the insulating qualities of the flexible tube.

Figure 10:
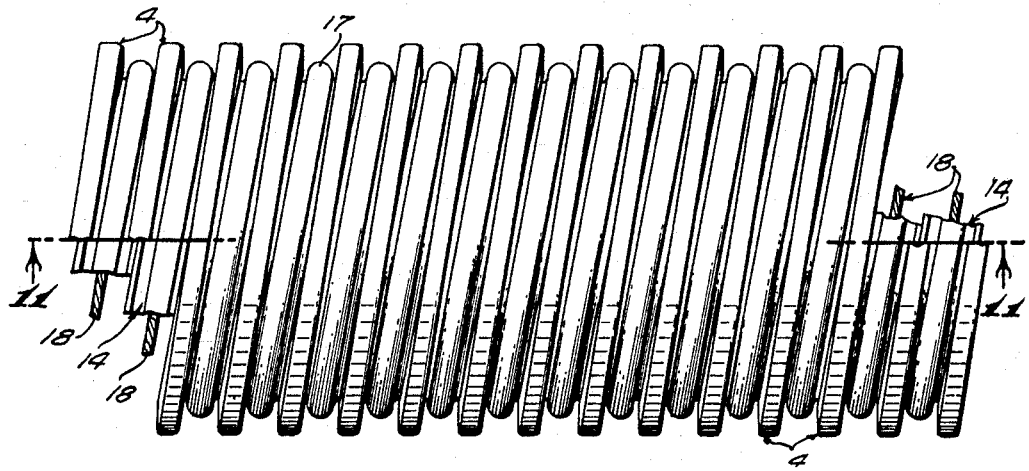
FIGURE 10 is a fragmentary side view showing a further modified form of the flexible tube which incorporates helical wires or cables for the purpose of conducting electricity or increasing the hoop strength of the flexible tube.
Figure 11:
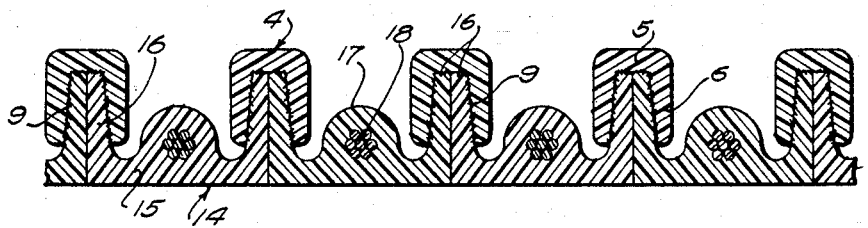
FIGURE 11 is an enlarged, fragmentary, sectional view thereof taken through 11—11 of FIGURE 10.

Reference is now directed to FIGURES 10 and 11. For some purposes it is desirable to provide means for the conduction of electricity between the axial ends of the flexible tube. Such an arrangement is desirable, for example, for the purpose of operating electrical appliances, such as a vacuum cleaner brush, at the intake end of the hose.

Figure 6:
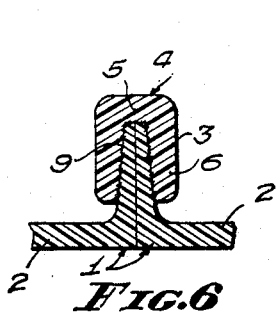
FIGURE 6 is an enlarged fragmentary view similar to FIGURE 2 showing a modification wherein the interlocking beads are omitted.
Figure 7:
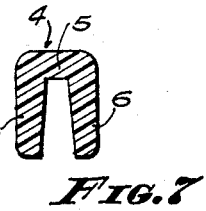
FIGURE 7 is an enlarged sectional view of the modified outer strip.
Figure 8:
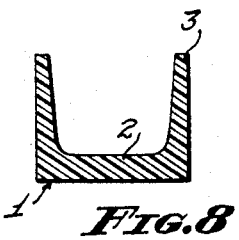
FIGURE 8 is an enlarged sectional view of the modified inner strip.
Figure 9:
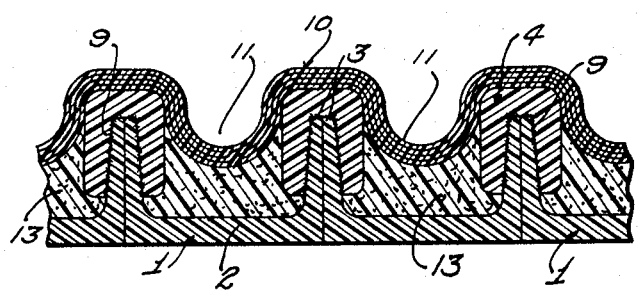
FIGURE 9 is a sectional view similar to FIGURE 2 showing the modified flexible tube wrapped with an incasing tape, and showing the resulting helical chamber filled with a foamed elastomer.

In order to incorporate electrical conductor means in the flexible tube, a modified inner or first plastic strip 14 is utilized which includes a web 15 and side flanges 16 similar to the web 2 and flanges 3 of the first described structure or the structure shown in FIGURES 6, 7 and 8. The flanges 16 of contiguous convolutions are joined together by an outer or second plastic strip 4 in the manner of the first described structure.

The web 15 is provided with a centrally disposed rib 17, preferably projecting from its external surface between the flanges 16. A conductor 18 is encased in the rib 17. In some instances a single conductor may be sufficient. However, in order to provide a pair of conductors, a pair of inner plastic strips 14 is utilized so as to form a double start helix. In this case a pair of outer plastic strips 4 is utilized in the manner of the outer plastic strip 4 of the first described structure or the structure shown in FIGURES 6, 7 and 8.

In place of wire, such as braided copper wire, which serves principally as a conductor 18, steel wire or high strength wire may be used for the purpose of increasing the hoop strength; that is, for the purpose of increasing the internal pressure-carrying capacity of the flexible tube.

The plastic material from which the plastic strips 1 and 4 are extruded, or from which the plastic tape 10 is formed, may vary substantially, depending upon the specific use of the tube. For example, if a high degree of crush resistance is required, relatively rigid or semirigid materials, such as polyvinyl chloride, acrylonitrile-butadiene styrene, or polypropylene, may be used.

For many purposes it is desired to have a tube which may be readily restored to circular section after being crushed. This result may be achieved, for example, by the use of copolymer ethylene-ethyl-acrylate. This copolymer may be used by itself or may be blended with a polyolefin. A flexible tube made from a blend containing 25% linear polyethylene is more resistant to crushing loads than one made of the straight copolymer. It seems to lose very little of its ability to be restored to its original circular section; that is, it is not permanently damaged if it should be crushed.

The selection of the plastic material utilized in the plastic strips 1 and 4 determines the manner in which the flanges 6 are bonded to the flanges 3. In some instances these may be bonded by heat applied during the forming operation; or a third plastic strip heated to its fusing state may be introduced as the tube is formed and form a thin layer, coating and bonding the confronting surfaces together; so that in either case the strips are essentially welded together. In other cases, it is desirable to coat the flanges 6 with a solvent. For example, if the plastic material is polyvinyl chloride a solvent such as cyclohexanone or tetrahydrofuran may be used.

Similarly, the plastic tape 10 may be bonded to itself by heat or by use of an appropriate solvent.

With regard to the construction shown in FIGURES 1–8 and in FIGURES 10 and 11, a particularly attractive flexible tube may be formed by using selected plastic material of different colors for the strips 1 and 4 or 14 and 4, as the case may be.

While particular embodiments of this invention have been shown and described, it is not intended to limit the same to the exact details of the construction set forth, and it embraces such changes, modifications, and equivalents of the parts and their information and arrangement as come within the purview of the appended claims.

What is claimed is:
1. A flexible tube, comprising:
 (a) an inner plastic strip of channel-shaped cross section including a relatively wide flat web and flexible flanges bordering the margins of said web, said inner strip being helically wound to form a tube with the flanges directed radially outward and the flanges of succeeding convolutions arranged in contiguous pairs;
 (b) and an outer plastic strip of channel-shaped cross section helically wound over said inner plastic strip and including a relatively narrow web overlying the contiguous pairs of radially outwardly directed flanges, and radially inwardly directed flexible flanges overlying and bonded to the distal sides of said pairs of flanges.
 (c) the flanges of said inner and outer strips being angularly flexible with respect to their webs such that said contiguous pairs of flanges of said inner strip are free to move apart at their innermost ends whereby, on application of axial tension to the convoluted and bonded strips, the contiguous pairs of flanges of the inner strip and the flanges of the outer strip are caused to diverge radially inwardly and the adjacent webs of each convolution of said inner strip are permitted to separate.
2. A flexible tube as set forth in claim 1 wherein::
 (a) said pairs of contiguous flanges of the inner strip define a continuous bead;
 (b) and the channel formed by said outer strip being enlarged to accommodate said bead to form a mechanical interlock therewith.
3. A flexible tube as set forth in claim 1;
 (a) said tube having a laminated plastic tape encasing said outer plastic strip and depressed into confronting relation to the web of said inner plastic strip;
 (b) said tape, the convolutions of said outer plastic strip, and the web of said inner plastic strip forming a helical chamber;
 (c) and a foamed elastomer filling said chamber.
4. A flexible substantially nonshortening, smooth-bored tube, comprising:
 (a) a plastic channel-shaped strip having a substantially flat web portion and a flexible flange along each of its lateral edges projecting outwardly generally transversely to said web, each of said flanges being adapted to flex angularly relative to said web portion,
 (b) said strip being helically wound to form a tube defined by the edgewise abutment of the web portions of adjacent convolutions such that the adjacent flanges of said convoluted strip project radially outwardly from said tube and the confronting side faces of said flanges are contiguous along a helical seam therebetween,
 (c) and sealing means extending in a helical path along the helical seam between the convolutions of said coiled strip linking the respective adjacent flanges,
 (d) said sealing means comprising a flexible plastic strip overlapping the outer edges of said adjacent flanges, joined to the outer side faces of said flanges and leaving the contiguous side faces of said flanges free to move apart at their inner ends, upon the application of tension to said convoluted strip, to permit the adjacent webs of each convolution of said strip to separate by the angular flexing of said adjacent flanges while maintaining said convolute tube fluid tight.

References Cited by the Examiner

UNITED STATES PATENTS

| | | | |
|---|---|---|---|
| 837,512 | 4/1906 | Seeley | 138—138 X |
| 848,238 | 3/1907 | Greenfield | 138—136 |
| 1,179,578 | 4/1916 | Sundh | 138—122 |
| 1,270,579 | 6/1918 | Witzenmann | 138—135 X |
| 2,578,140 | 12/1951 | Krupp et al. | 138—121 X |
| 2,674,297 | 4/1954 | Greenwald | 138—125 X |
| 2,707,491 | 5/1955 | Harris et al. | 138—133 |
| 2,711,315 | 6/1955 | Mosebach | 156—143 X |
| 2,731,070 | 1/1956 | Meissner | 138—132 X |
| 2,739,089 | 1/1956 | Hageltorn | 138—121 X |
| 2,822,857 | 2/1958 | Rothermel et al. | 138—122 X |
| 2,973,295 | 2/1961 | Rodgers. | |
| 3,112,771 | 12/1963 | Bringolf | 138—122 X |

FOREIGN PATENTS

| | | |
|---|---|---|
| 223,327 | 10/1924 | Great Britain. |
| 448,933 | 6/1936 | Great Britain. |
| 683,259 | 11/1952 | Great Britain. |

LAVERNE D. GEIGER, *Primary Examiner.*

LEWIS J. LENNY, *Examiner.*

T. MOORHEAD, *Assistant Examiner.*